(12) United States Patent  (10) Patent No.: US 7,589,918 B2
Sato  (45) Date of Patent: Sep. 15, 2009

(54) IMAGING LENS

(75) Inventor: Kenichi Sato, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 11/860,384

(22) Filed: Sep. 24, 2007

(65) Prior Publication Data

US 2008/0074760 A1   Mar. 27, 2008

(30) Foreign Application Priority Data

Sep. 25, 2006 (JP) .......................... P2006-258738

(51) Int. Cl.
*G02B 9/34* (2006.01)
(52) U.S. Cl. ...................... 359/779; 359/772
(58) Field of Classification Search ................ 359/771, 359/772, 779, 686
See application file for complete search history.

(56) References Cited

U.S. PATENT DOCUMENTS 6,342,975 B1 * 1/2002 Yamanashi ................. 359/689

FOREIGN PATENT DOCUMENTS

| JP | 3-44612 A | 2/1991 |
|---|---|---|
| JP | 7-318803 A | 12/1995 |
| JP | 9-145997 A | 6/1997 |
| JP | 2000-180719 A | 6/2000 |
| JP | 2004-102234 A | 4/2004 |
| KR | 10-2002-00662 51 A | 8/2002 |
| KR | 10-2004-0010184 A | 1/2004 |

OTHER PUBLICATIONS

Korean Office Action dated Apr. 24, 2009 for Korean Application 10-2007-0095775.

* cited by examiner

*Primary Examiner*—William C Choi
*Assistant Examiner*—Jack Dinh
(74) *Attorney, Agent, or Firm*—Birch, Stewart, Kolasch & Birch, LLP

(57) ABSTRACT

A single focus imaging lens comprises: a front lens group including one or two lenses and having a positive refractive power as a whole; a rear lens group including two or three lenses and having a negative refractive power as a whole; and a focusing lens, disposed between the front lens group and the rear lens group, that has a positive refractive power and moves on an optical axis for adjusting focus, wherein the following conditional expression is satisfied:

$$1.0 < FL/f < 5.0 \quad (X)$$

where
  f: focal length of the single focus imaging lens;
  FL: focal length of the focusing lens.

5 Claims, 14 Drawing Sheets

EXAMPLE 1

EXAMPLE 1

CLOSEST FOCUSING DISTANCE

EXAMPLE 2

CLOSEST FOCUSING DISTANCE

FIG. 3    EXAMPLE 3
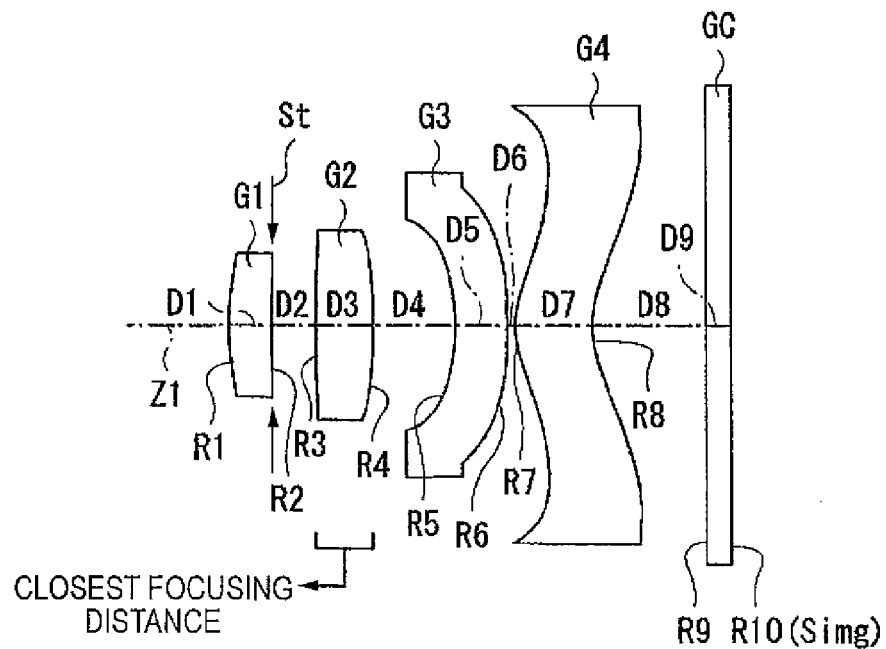
FIG. 4    EXAMPLE 4
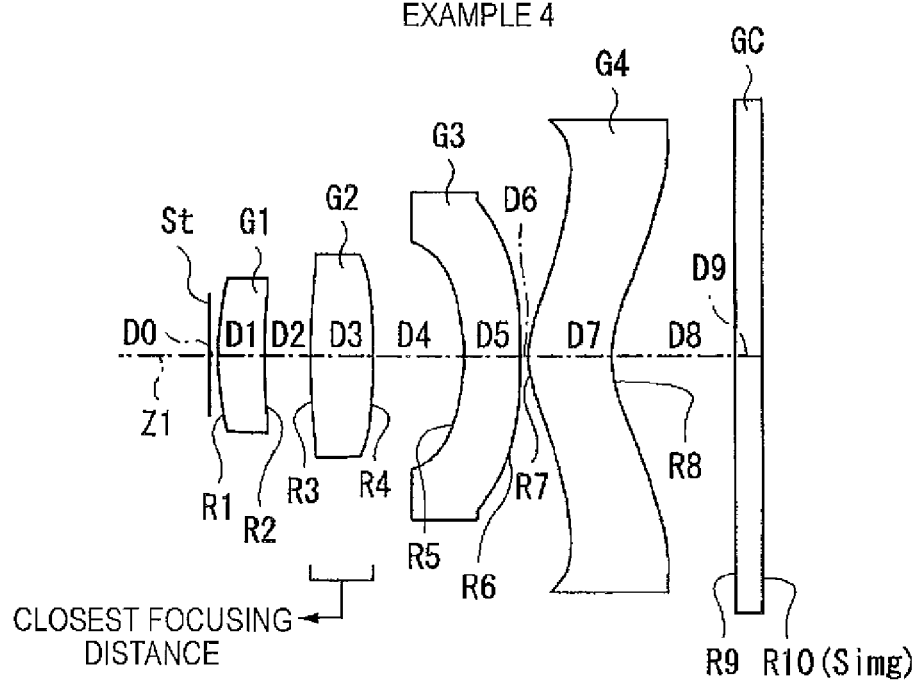

EXAMPLE 5

FIG. 6A

| | EXAMPLE 1: LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| G1 | 1 | 2.470 | 0.50 | 1.639 | 55.5 |
| | 2 | 6.037 | *0.70 (0.55) | | |
| G2 | 3 | 12.004 | 0.50 | 1.694 | 53.2 |
| | 4 | -14.847 | *0.80 (0.95) | | |
| G3 | 5 | -2.190 | 0.40 | 1.531 | 55.4 |
| | 6 | 4.465 | 0.08 | | |
| G4 | 7 | 1.015 | 1.01 | 1.531 | 55.4 |
| | 8 | 1.875 | 1.15 | | |
| GC | 9 | ∞ | 0.30 | 1.516 | 64.1 |
| | 10 | ∞ | 0.00 | | |

* A PARENTHESIZED VALUE DENOTES AN AIRSPACE BETWEEN LENSES WITH AN OBJECT DISTANCE SET TO 20cm.
(f=4.33, FNo.=3.5, 2ω=66.0°)

FIG. 6B

| | EXAMPLE 1: ASPHERIC SURFACE DATA | | | |
|---|---|---|---|---|
| ASPHERIC SURFACE COEFFICIENT | SURFACE NUMBER | | | |
| | FIRST SURFACE | SECOND SURFACE | THIRD SURFACE | FOURTH SURFACE |
| K | 7.339E+00 | 1.000E+00 | 1.136E+02 | 3.457E+01 |
| A3 | -3.171E-02 | 6.068E-03 | 0.000E+00 | 0.000E+00 |
| A4 | 1.094E-01 | -7.539E-02 | 1.308E-03 | -6.128E-03 |
| A5 | -5.155E-01 | 2.035E-01 | 0.000E+00 | 0.000E+00 |
| A6 | 6.790E-01 | -2.681E-01 | 9.708E-03 | 5.684E-03 |
| A7 | -2.540E-01 | 1.470E-01 | 0.000E+00 | 0.000E+00 |
| A8 | -4.963E-01 | 1.243E-02 | -2.553E-02 | -1.340E-02 |
| A9 | 6.058E-01 | -2.955E-01 | 0.000E+00 | 0.000E+00 |
| A10 | -3.172E-01 | 3.206E-01 | 1.839E-02 | 7.523E-03 |
| | FIFTH SURFACE | SIXTH SURFACE | SEVENTH SURFACE | EIGHTH SURFACE |
| K | 3.349E+00 | 7.627E+00 | -5.940E-02 | -5.279E+00 |
| A3 | 3.457E-02 | -3.481E-01 | -2.855E-01 | 1.648E-01 |
| A4 | 3.333E-02 | 1.948E-01 | -6.542E-04 | -2.380E-01 |
| A5 | 5.938E-02 | -1.479E-02 | 3.164E-02 | 1.080E-01 |
| A6 | -1.159E-01 | -4.635E-02 | 1.141E-02 | -5.728E-03 |
| A7 | -1.881E-02 | -2.008E-02 | -3.154E-03 | -7.256E-03 |
| A8 | 3.291E-02 | 1.897E-02 | -2.829E-03 | 1.014E-04 |
| A9 | 2.569E-02 | 1.708E-02 | 4.452E-04 | 8.861E-04 |
| A10 | -1.960E-02 | -1.120E-02 | 1.010E-04 | -1.700E-04 |

FIG. 7A

| | EXAMPLE 2: LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| G1 { | 1 | 2.625 | 0.60 | 1.639 | 55.5 |
| | 2 | 5.360 | *0.60 (0.47) | | |
| G2 { | 3 | 9.725 | 0.60 | 1.621 | 60.3 |
| | 4 | 6.000 | *0.90 (1.03) | | |
| G3 { | 5 | -2.190 | 0.40 | 1.531 | 55.4 |
| | 6 | 5.308 | 0.08 | | |
| G4 { | 7 | 1.038 | 1.01 | 1.531 | 55.4 |
| | 8 | 1.754 | 1.15 | | |
| GC { | 9 | ∞ | 0.30 | 1.516 | 64.1 |
| | 10 | ∞ | 0.00 | | |

* A PARENTHESIZED VALUE DENOTES AN AIRSPACE BETWEEN LENSES WITH AN OBJECT DISTANCE SET TO 20cm.
(f=4.43, FNo.=3.5, 2ω=64.6°)

FIG. 7B

| | EXAMPLE 2: ASPHERIC SURFACE DATA | | | |
|---|---|---|---|---|
| ASPHERIC SURFACE COEFFICIENT | SURFACE NUMBER | | | |
| | FIRST SURFACE | SECOND SURFACE | THIRD SURFACE | FOURTH SURFACE |
| K | 7.511E+00 | 1.000E+00 | 6.577E+01 | 5.439E+01 |
| A3 | -3.008E-02 | 5.463E-03 | -4.362E-03 | -8.761E-03 |
| A4 | 1.232E-01 | -7.215E-02 | 1.288E-03 | -5.538E-04 |
| A5 | -5.357E-01 | 1.904E-01 | -1.188E-03 | -2.323E-03 |
| A6 | 6.808E-01 | -2.742E-01 | 2.311E-03 | -1.578E-06 |
| A7 | -2.295E-01 | 1.803E-01 | -1.087E-02 | -5.189E-03 |
| A8 | -4.715E-01 | 9.409E-02 | -3.130E-02 | -1.616E-02 |
| A9 | 6.160E-01 | -2.395E-01 | 5.946E-03 | 7.418E-04 |
| A10 | -3.212E-01 | 6.483E-02 | 3.411E-02 | 1.312E-02 |
| | FIFTH SURFACE | SIXTH SURFACE | SEVENTH SURFACE | EIGHTH SURFACE |
| K | 3.349E+00 | 9.638E+00 | -2.385E-02 | -5.279E+00 |
| A3 | 3.457E-02 | -3.517E-01 | -2.948E-01 | 1.671E-01 |
| A4 | 3.333E-02 | 2.029E-01 | -6.601E-04 | -2.382E-01 |
| A5 | 5.938E-02 | -1.310E-02 | 3.212E-02 | 1.075E-01 |
| A6 | -1.159E-01 | -4.603E-02 | 1.139E-02 | -5.728E-03 |
| A7 | -1.881E-02 | -2.042E-02 | -3.224E-03 | -7.256E-03 |
| A8 | 3.291E-02 | 1.852E-02 | -2.860E-03 | 1.014E-04 |
| A9 | 2.569E-02 | 1.687E-02 | 4.268E-04 | 8.861E-04 |
| A10 | -1.960E-02 | -1.105E-02 | 9.238E-05 | -1.700E-04 |

FIG. 8A

| | EXAMPLE 3: LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| G1 | 1 | 3.511 | 0.50 | 1.729 | 54.7 |
| | 2 | 11.803 | *0.70 (0.525) | | |
| G2 | 3 | 13.486 | 0.70 | 1.571 | 62.3 |
| | 4 | -10.806 | *0.80 (0.975) | | |
| G3 | 5 | -2.313 | 0.60 | 1.606 | 27.0 |
| | 6 | 7.081 | 0.10 | | |
| G4 | 7 | 0.904 | 0.90 | 1.531 | 55.4 |
| | 8 | 1.449 | 1.32 | | |
| GC | 9 | ∞ | 0.30 | 1.516 | 64.1 |
| | 10 | ∞ | 0.00 | | |

* A PARENTHESIZED VALUE DENOTES AN AIRSPACE BETWEEN LENSES WITH AN OBJECT DISTANCE SET TO 20cm.
(f=4.50, FNo.=3.5, 2ω=64.2°)

FIG. 8B

| | EXAMPLE 3: ASPHERIC SURFACE DATA | | | |
|---|---|---|---|---|
| ASPHERIC SURFACE COEFFICIENT | SURFACE NUMBER | | | |
| | FIRST SURFACE | SECOND SURFACE | THIRD SURFACE | FOURTH SURFACE |
| K | 9.096E+00 | 1.000E+00 | 4.645E+01 | 8.157E+01 |
| A3 | -1.703E-02 | 1.397E-03 | -1.269E-02 | -4.382E-03 |
| A4 | 9.935E-02 | -6.025E-02 | 1.304E-02 | -1.883E-02 |
| A5 | -4.870E-01 | 1.820E-01 | -1.485E-02 | -4.263E-03 |
| A6 | 7.302E-01 | -3.111E-01 | -9.915E-03 | 4.608E-04 |
| A7 | -2.592E-01 | 1.911E-01 | 8.850E-03 | 9.675E-04 |
| A8 | -5.369E-01 | 1.080E-01 | 5.905E-03 | -7.514E-03 |
| A9 | 5.585E-01 | -2.805E-01 | 1.853E-02 | 4.767E-03 |
| A10 | -1.454E-01 | 1.794E-01 | -1.979E-02 | -9.386E-04 |
| | FIFTH SURFACE | SIXTH SURFACE | SEVENTH SURFACE | EIGHTH SURFACE |
| K | 3.349E+00 | 1.728E+01 | 8.075E-02 | -5.279E+00 |
| A3 | 3.457E-02 | -3.510E-01 | -3.439E-01 | 1.873E-01 |
| A4 | 3.333E-02 | 2.040E-01 | 2.333E-02 | -2.528E-01 |
| A5 | 5.938E-02 | 6.375E-03 | 1.512E-02 | 1.080E-01 |
| A6 | -1.159E-01 | -4.342E-02 | 4.366E-03 | -5.728E-03 |
| A7 | -1.881E-02 | -2.812E-02 | -3.435E-03 | -7.256E-03 |
| A8 | 3.291E-02 | 1.118E-02 | -1.527E-03 | 1.014E-04 |
| A9 | 2.569E-02 | 1.519E-02 | 1.082E-03 | 8.861E-04 |
| A10 | -1.960E-02 | -6.882E-03 | -2.032E-04 | -1.700E-04 |

FIG. 9A

| | EXAMPLE 4: LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| | 0 (APERTURE STOP) | — | 0.10 | | |
| G1 | 1 | 3.342 | 0.50 | 1.713 | 53.9 |
| | 2 | 6.515 | *0.50 (0.375) | | |
| G2 | 3 | 6.350 | 0.70 | 1.562 | 62.6 |
| | 4 | 6.000 | *1.00 (1.125) | | |
| G3 | 5 | -2.323 | 0.60 | 1.606 | 27.0 |
| | 6 | 7.003 | 0.10 | | |
| G4 | 7 | 0.914 | 0.90 | 1.531 | 55.4 |
| | 8 | 1.409 | 1.33 | | |
| GC | 9 | ∞ | 0.30 | 1.516 | 64.1 |
| | 10 | ∞ | 0.00 | | |

* A PARENTHESIZED VALUE DENOTES AN AIRSPACE BETWEEN LENSES WITH AN OBJECT DISTANCE SET TO 20cm.
(f=4.46, FNo.=3.5, 2ω=63.2°)

FIG. 9B

| | EXAMPLE 4: ASPHERIC SURFACE DATA | | | |
|---|---|---|---|---|
| ASPHERIC SURFACE COEFFICIENT | SURFACE NUMBER | | | |
| | FIRST SURFACE | SECOND SURFACE | THIRD SURFACE | FOURTH SURFACE |
| K | 9.038E+00 | 1.000E+00 | -1.756E+01 | 8.940E+01 |
| A3 | -1.826E-02 | 4.801E-03 | -5.893E-03 | -3.921E-03 |
| A4 | 9.832E-02 | -6.384E-02 | 1.143E-02 | -1.953E-02 |
| A5 | -4.806E-01 | 1.824E-01 | -1.023E-02 | -1.105E-02 |
| A6 | 7.291E-01 | -3.087E-01 | -6.894E-03 | -5.615E-03 |
| A7 | -2.747E-01 | 1.997E-01 | 4.344E-03 | 1.422E-04 |
| A8 | -5.489E-01 | 1.247E-01 | -1.164E-03 | -3.327E-03 |
| A9 | 5.486E-01 | -2.741E-01 | 1.856E-02 | 8.102E-03 |
| A10 | -9.969E-02 | 1.394E-01 | -1.877E-02 | -7.395E-03 |
| | FIFTH SURFACE | SIXTH SURFACE | SEVENTH SURFACE | EIGHTH SURFACE |
| K | 3.349E+00 | 1.594E+01 | 8.300E-02 | -5.279E+00 |
| A3 | 3.457E-02 | -3.347E-01 | -3.453E-01 | 1.820E-01 |
| A4 | 3.333E-02 | 2.030E-01 | 2.913E-02 | -2.493E-01 |
| A5 | 5.938E-02 | 6.777E-03 | 1.601E-02 | 1.079E-01 |
| A6 | -1.159E-01 | -4.237E-02 | 4.137E-03 | -5.728E-03 |
| A7 | -1.881E-02 | -2.771E-02 | -3.527E-03 | -7.256E-03 |
| A8 | 3.291E-02 | 1.108E-02 | -1.510E-03 | 1.014E-04 |
| A9 | 2.569E-02 | 1.513E-02 | 1.101E-03 | 8.861E-04 |
| A10 | -1.960E-02 | -6.616E-03 | -2.060E-04 | -1.700E-04 |

*FIG. 10A*

| | EXAMPLE 5: LENS DATA | | | | |
|---|---|---|---|---|---|
| | Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| | 0 (APERTURE STOP) | — | 0.10 | | |
| G1 { | 1 | 3.138 | 0.50 | 1.713 | 53.9 |
| | 2 | 9.430 | *0.39 (0.162) | | |
| G2 { | 3 | 8.000 | 0.70 | 1.490 | 65.4 |
| | 4 | -83.755 | *0.90 (1.128) | | |
| G3 { | 5 | -2.899 | 0.60 | 1.606 | 27.0 |
| | 6 | 7.089 | 0.10 | | |
| G4 { | 7 | 0.957 | 0.90 | 1.531 | 55.4 |
| | 8 | 1.379 | 1.35 | | |
| GC { | 9 | ∞ | 0.30 | 1.516 | 64.1 |
| | 10 | ∞ | 0.00 | | |

* A PARENTHESIZED VALUE DENOTES AN AIRSPACE BETWEEN LENSES WITH AN OBJECT DISTANCE SET TO 20cm.
(f=4.60, FNo.=3.5, 2ω=62.8°)

*FIG. 10B*

| | EXAMPLE 5: ASPHERIC SURFACE DATA | | | |
|---|---|---|---|---|
| ASPHERIC SURFACE COEFFICIENT | SURFACE NUMBER | | | |
| | FIRST SURFACE | SECOND SURFACE | THIRD SURFACE | FOURTH SURFACE |
| K | 8.157E+00 | 1.000E+00 | -4.158E+01 | 6.000E+03 |
| A3 | -2.022E-02 | 4.180E-03 | -1.982E-03 | -1.051E-02 |
| A4 | 9.903E-02 | -6.713E-02 | 3.083E-04 | -1.136E-02 |
| A5 | -4.798E-01 | 1.821E-01 | -5.122E-03 | -8.573E-03 |
| A6 | 7.192E-01 | -3.141E-01 | 7.581E-03 | -6.906E-03 |
| A7 | -2.682E-01 | 2.043E-01 | 1.199E-02 | -3.356E-04 |
| A8 | -5.396E-01 | 1.270E-01 | -1.058E-02 | -3.535E-03 |
| A9 | 5.472E-01 | -2.748E-01 | 1.648E-03 | 1.082E-02 |
| A10 | -1.234E-01 | 1.209E-01 | -1.903E-03 | -5.980E-03 |
| | FIFTH SURFACE | SIXTH SURFACE | SEVENTH SURFACE | EIGHTH SURFACE |
| K | 3.349E+00 | 1.741E+01 | 7.438E-02 | -5.279E+00 |
| A3 | 3.457E-02 | -3.256E-01 | -3.533E-01 | 1.500E-01 |
| A4 | 3.333E-02 | 2.104E-01 | 2.112E-02 | -2.372E-01 |
| A5 | 5.938E-02 | 6.141E-03 | 1.575E-02 | 1.033E-01 |
| A6 | -1.159E-01 | -4.103E-02 | 4.645E-03 | -5.728E-03 |
| A7 | -1.881E-02 | -2.919E-02 | -3.310E-03 | -7.256E-03 |
| A8 | 3.291E-02 | 1.072E-02 | -1.471E-03 | 1.014E-04 |
| A9 | 2.569E-02 | 1.544E-02 | 1.110E-03 | 8.861E-04 |
| A10 | -1.960E-02 | -6.018E-03 | -1.638E-04 | -1.700E-04 |

*FIG. 11*

| | VALUES RELATED TO CONDITIONAL EXPRESSIONS | | | | |
|---|---|---|---|---|---|
| | CONDITIONAL EXPRESSION (1) $f1/f$ | CONDITIONAL EXPRESSION (2) $f2/f$ | CONDITIONAL EXPRESSION (3) $|f3/f|$ | CONDITIONAL EXPRESSION (4) $f4/f$ | CONDITIONAL EXPRESSION (5) $R4A/f$ |
| EXAMPLE 1 | 1.43 | 2.23 | 0.626 | 0.683 | 0.23 |
| EXAMPLE 2 | 1.68 | 1.74 | 0.647 | 0.726 | 0.23 |
| EXAMPLE 3 | 1.49 | 2.36 | 0.625 | 0.640 | 0.20 |
| EXAMPLE 4 | 1.97 | 1.61 | 0.614 | 0.656 | 0.20 |
| EXAMPLE 5 | 1.39 | 3.24 | 0.721 | 0.734 | 0.21 |

EXAMPLE 1: OBJECT DISTANCE SET AT INFINITY

SPHERICAL ABERRATION

ASTIGMATISM

DISTORTION

EXAMPLE 1: OBJECT DISTANCE SET TO NEAR DISTANCE (20cm)

SPHERICAL ABERRATION

ASTIGMATISM

DISTORTION

EXAMPLE 2: OBJECT DISTANCE SET AT INFINITY

EXAMPLE 2: OBJECT DISTANCE SET TO NEAR DISTANCE (20cm)

EXAMPLE 3: OBJECT DISTANCE SET AT INFINITY

EXAMPLE 3: OBJECT DISTANCE SET TO NEAR DISTANCE (20cm)

EXAMPLE 4: OBJECT DISTANCE SET AT INFINITY

EXAMPLE 4: OBJECT DISTANCE SET TO NEAR DISTANCE (20cm)

EXAMPLE 5: OBJECT DISTANCE SET AT INFINITY

EXAMPLE 5: OBJECT DISTANCE SET TO NEAR DISTANCE (20cm)

IMAGING LENS

BACKGROUND OF THE INVENTION

1. Field of the Invention

The present invention relates to an imaging lens which is to be installed in an image pick-up apparatus such as a digital still camera, a mobile phone with a camera, and a personal digital assistants (PDA) which utilizes an image sensing device such as a CCD (Charge Coupled Device) or a CMOS (Complementary Metal Oxide Semiconductor) and more particularly to a single focus imaging lens which can adjust focus.

2. Description of the Related Art

In recent years, miniaturization and increase in the number of pixels mounted have been in progress in image sensing devices such as CCDs and CMOSes. In conjunction with this trend, smaller and higher-performance image pick-up equipment and lenses installed thereon have been in demand. In the related art, many of imaging lenses to be installed on, for example, mobile phones with a camera are made up of three lenses. However, in order to cope with the increase in the number of pixels mounted on such image pick-up equipment, the number of lenses mounted in such imaging lenses tends to be increased. JP-A-2000-180719 discloses single focus imaging lenses which are made up of four lenses and five lenses, respectively. The imaging lenses are made up of, in order from an object side thereof, a frontlens group, an aperture stop and a rear lens group, and the rear lens group is made up of, in order from an object side thereof, a negative lens, a positive lens and a positive lens. In addition, the rear lens group has at least one aspheric surface.

In recent years, autofocus has been in demand even for imaging lenses such as those described above which are made up of a relatively small number of lenses for installation on mobile phones with a camera. In the related art, in these imaging lenses, since the number of lenses mounted is relatively small, not a zoom lens configuration but a single focus lens configuration has been adopted, and as the focus adjusting system, focusing by moving the whole lens system (along an optical axis) has generally been adopted. With focusing by moving the whole lens system, however, since the overall length is changed by focusing, there is caused a drawback that the construction of a lens barrel becomes complex and the lens system is enlarged. In the imaging lens described in JP-A-2000-180719, as is described in its 28$^{th}$ paragraph, the total focusing system is adopted. Note that although JP-A-2000-180719 states that only part of the imaging lens may be shifted for adjusting focus, there has been disclosed therein no specific embodiment. Since the imaging lens described in JP-A-2000-180719 is designed on the premise that the total focusing system is adopted, in the event that for example, an internal focusing system is attempted to be adopted in which part of internal lens components is shifted, the image plane changes largely as focus is adjusted, and hence, the imaging lens cannot cope with the increase in the number of pixels mounted.

SUMMARY OF THE INVENTION

The invention has been made in view of the problem, and an object thereof is to provide a small, high-performance imaging lens which can implement a good focus adjustment without changing the overall length even though the imaging lens is a single focus lens made up of a relatively small number of lenses.

An imaging lens according to the invention is a single focus imaging lens comprising: a front lens group including one or two lenses and having a positive refractive power as a whole; a rear lens group including two or three lenses and having a negative refractive power as a whole; and a focusing lens, disposed between the front lens group and the rear lens group, that has a positive refractive power and moves on an optical axis for adjusting focus, wherein the following conditional expression is satisfied:

$$1.0 < FL/f < 5.0 \tag{X}$$

where f denotes a focal length of the single focus imaging lens, and FL denotes focal length of the focusing lens.

In the imaging lens according to the invention, the focusing lens is disposed between the front lens group and the rear lens group, which are both made up of a relatively small number of lenses, whereby the internal focusing type focus adjustment is implemented by shifting the focusing lens. In this case, the focal length of the focusing lens is set properly in such a manner as to satisfy the conditional expression (X), so that the sensitivity of the focusing lens (a sensitivity to a change in the position of image plane associated with a shift of the focusing lens) and the lens shift amount at the time of adjusting focus are suppressed to appropriate values, whereby a good focus adjustment is implemented without changing the overall length.

The imaging lens according to the invention can comprise, for example, in order from an object side thereof: a first lens having a positive refractive power; a second lens having a positive refractive power; a third lens having a negative refractive power with an object side surface including a concave surface in the vicinity of the optical axis; and a fourth lens having a positive meniscus shape with an object side surface including a convex surface in the vicinity of the optical axis. In addition, the first lens may be made to function as the front lens group, the third lens and the fourth lens may be made to function as the rear lens group, and the second lens may be made to function as the focusing lens, and the second lens may be made to move on the optical axis for adjusting focus.

In the event that the imaging lens is configured as has been described above, the configuration and refractive power of each of the lenses are made appropriate by the lens configuration which is made up of a relatively small number of lenses such as four lenses in total, thereby making it possible to realize miniaturization and high performance. In addition, the second lens, which functions as the focusing lens, is disposed between the first lens and the third lens, and by shifting the second lens, the internal focusing type focus adjustment is implemented. In this case, since the focal length of the second lens is set properly in such a manner as to satisfy the conditional expression (X), the sensitivity of the second lens (a sensitivity to a change in the position of image plane associated with a shift of the focusing lens) and the lens shift amount at the time of adjusting focus are suppressed to appropriate values, whereby a good focus adjustment is implemented without changing the overall length of the lens.

In the event that the configuration described above is adopted, the following conditional expressions are preferably satisfied. Due to this, power balance between respective lenses is optimized, miniaturizaion and enhancing performance can be more easily attained.

$$1.0 < f1/f < 3.0 \tag{1}$$

$$1.0 < f2/f < 5.0 \tag{2}$$

$$0.5<|f3/f|<1.0 \quad (3)$$

$$0.5<f4/f<1.0 \quad (4)$$

Where f denotes a focal length of the single focus imaging lens, f1 a focal length of the first lens, f2 a focal length of the second lens, f3 a focal length of the third lens, and f4 a focal length of the fourth lens.

In addition, the following configuration is preferably adopted; the first lens has preferably an object side surface including a convex shape in the vicinity of the optical axis, the second lens has an image side surface including a convex shape in the vicinity of the optical axis, the third lens has a concave shape in the vicinity of the optical axis on both sides thereof, and the fourth lens satisfies the following conditional expression.

By adopting this configuration, the configuration of each lens is optimized, which is advantageous in correcting aberrations. In addition, it becomes easy to secure a back focus which is necessary to dispose a cover glass or the like.

$$0.15<R4A/f<0.35 \quad (5),$$

where, f denotes a focal length of the single focus imaging lens, and R4A a paraxial radius of curvature of the object side surface of the fourth lens.

BRIEF DESCRIPTION OF THE DRAWINGS

FIG. 3 is a sectional view of a lens corresponding to an imaging lens according to Example 3 of the invention;

FIG. 4 is a sectional view of a lens corresponding to an imaging lens according to Example 4 of the invention;

FIG. 6A shows a table showing lens data of the imaging lens according to Example 1 of the invention;

FIG. 6B shows a table showing lens data related to aspheric surfaces according to Example 1 of the invention;

FIG. 7A shows a table showing lens data of the imaging lens according to Example 2 of the invention;

FIG. 7B shows a table showing lens data related to aspheric surfaces according to Example 2 of the invention;

FIG. 8A shows a table showing lens data of the imaging lens according to Example 3 of the invention;

FIG. 5B shows a table showing lens data related to aspheric surfaces according to Example 3 of the invention;

FIG. 9A shows a table showing lens data of the imaging lens according to Example 4 of the invention;

FIG. 9B shows a table showing lens data related to aspheric surfaces according to Example 4 of the invention;

FIG. 10A shows a table showing lens data of the imaging lens according to Example 5 of the invention;

FIG. 10B shows a table showing lens data related to aspheric surfaces according to Example 5 of the invention;

FIG. 11 shows a table showing values related to conditional expressions altogether for the respective examples;

DETAILED DESCRIPTION OF THE INVENTION

Hereinafter, an embodiment of the invention will be described in detail by reference to the accompanying drawings.

An imaging lens according to this embodiment is a single focus imaging lens and includes a front lens group made up or one or two lenses and having a positive refractive power as a whole and a rear lens group made up of two or three lenses and having a negative refractive power as a whole. Furthermore, the imaging lens includes a focusing lens which is disposed between the front lens group and the rear lens group. The focusing lens has a positive refractive power, is made to move on an optical axis for focus adjustment and satisfies the following conditional expression:

$$1.0 < FL/f < 5.0 \tag{X}$$

where, f denotes a focal length of the whole lens system, and FL a focal length of the focusing lens.

Hereinafter, in this embodiment, the invention will be described by taking for example an imaging lens which is made up of a total of four lenses, that is, a front lens group having one lens, a rear lens group having two lenses and a focusing lens made up of one lens. However, the imaging lens according to this embodiment is not limited to a configuration example which will be described below. For example, the invention can be applied to an imaging lens which is made up of a total of five lenses. In this case, a second or third lens from the object side can be used as the focusing lens.

Figure 1:
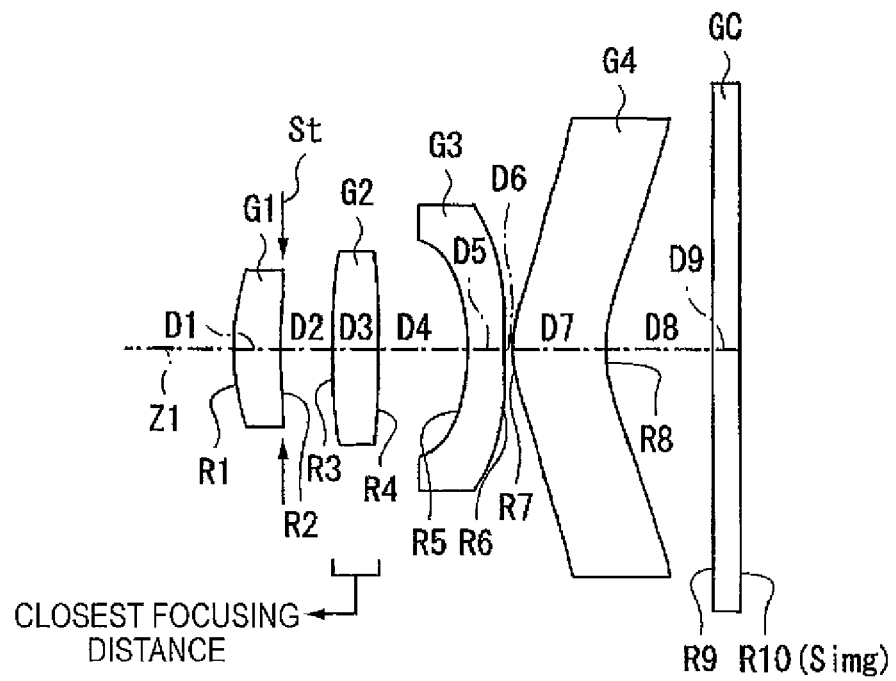
FIG. 1 is a sectional view of a lens corresponding to an imaging lens according to Example 1 of the invention.
Figure 2:
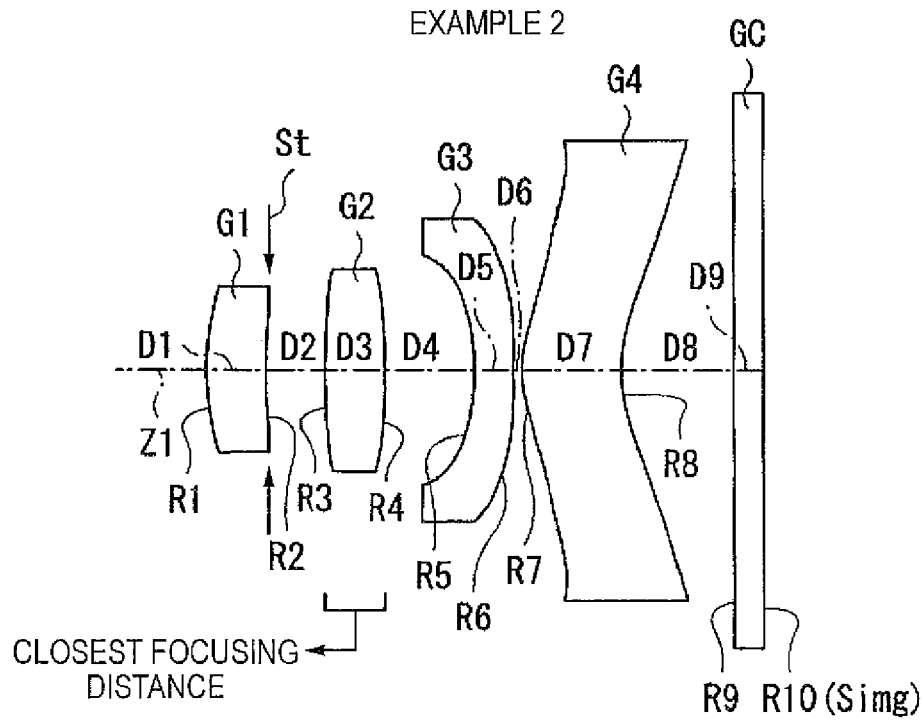
FIG. 2 is a sectional view of a lens corresponding to an imaging lens according to Example 2 of the invention.
Figure 5:
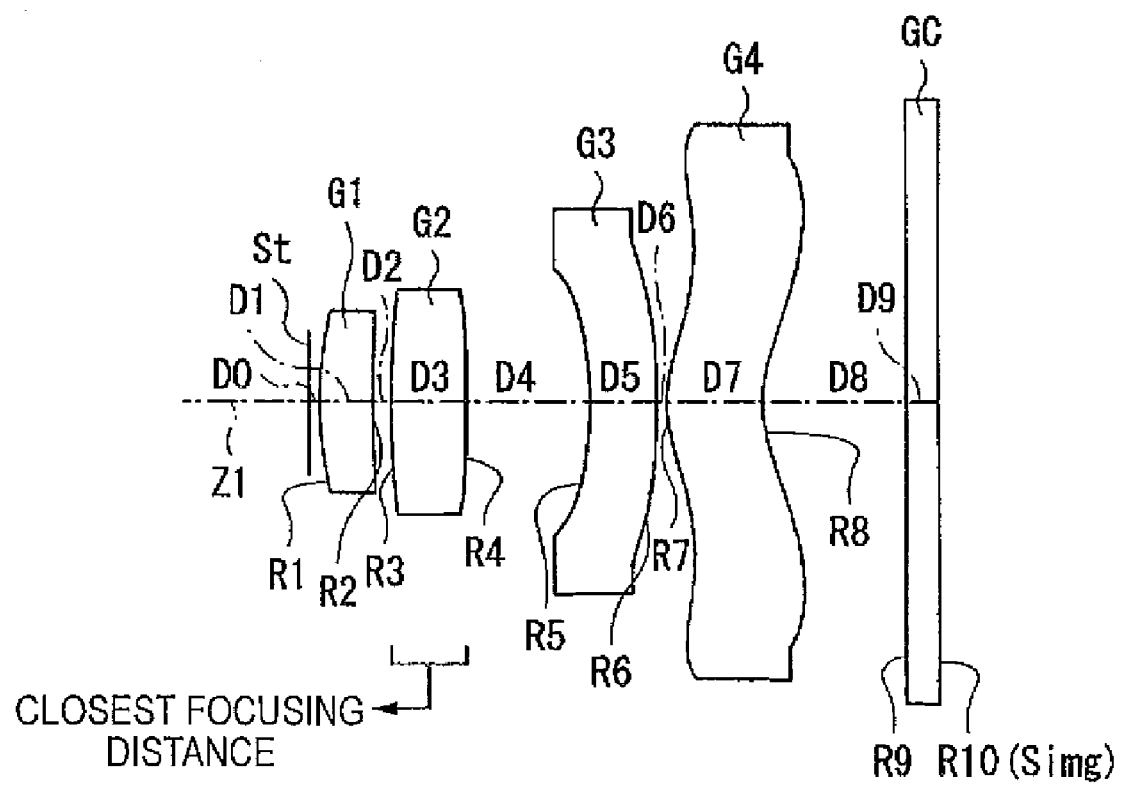
FIG. 5 is a sectional view of a lens corresponding to an imaging lens according to Example 5 of the invention.

FIG. 1 shows a first configuration example of the imaging lens according to the embodiment of the invention. This configuration example corresponds to a lens configuration of a first numerical example (FIG. 6A, FIG. 6B), which will be described later on. FIG. 2 shows a second configuration example, which corresponds to a lens configuration of a second numerical example (FIG. 7A, FIG. 7B), which will be described later on. FIG. 3 shows a third configuration example, which corresponds to a lens configuration of a third numerical example (FIG. 8A (FIG. 8B), which will be described later on, and FIG. 4 shows a fourth configuration example, which corresponds to a lens configuration of a fourth numerical example (FIG. 9A, FIG. 9B), which will be described later on. FIG. 5 shows a fifth configuration example, which corresponds to a lens configuration of a fifth numerical example (FIG. 10A, FIG. 10B), which will be described later on. In FIGS. 1 to 5, reference alphanumeric Ri denotes a radius of curvature of an ith surface which results when giving reference alphanumerics to surfaces of the constituent lenses in the increasing order from an object side towards an image (image forming) side with an object side surface of the first lens from the object side regarded as a first surface. Reference alphanumeric Di denotes an on-axis surface spacing between the ith surface and an i+1th surface on the optical axis Z1. Note that the respective configuration examples basically have the same configuration.

This imaging lens is preferably used on various types of image pick-up apparatuses such as digital still cameras, mobile phones with a camera and personal digital assistants which utilize an image sensing device such as a CCD or CMOS. This mage pick-up lens includes, in order from an object side thereof, a first lens G1, a second lens G2, a third lens G3, and a fourth lens G4. In this imaging lens, the first lens G1 is made to function as a front lens group, the third and fourth lenses are made to function as a rear lens group, and the second lens G2 is made to function as a focusing lens, the second lens G2 being made to shift on an optical axis for adjusting focus. The second lens G2 shifts on the optical axis Z1 towards the object side when adjusting focus from an object at infinity to an object at a closest focusing distance.

An optical aperture stop St is preferably disposed as much as possible on the object side so as to secure a telecentric characteristic. In the configuration examples shown in FIGS. 1, 2 and 3, an aperture stop St is disposed on a rear side of the first lens G1. More specifically, the aperture stop St is located in a position within an effective aperture of a rear surface of the first lens G1 which lies furthest from the object side thereof. In the configuration examples shown in FIGS. 4 and 5, an aperture stop St is disposed on a front side of the first lens 61 or in a position of the lens system which lies closest to an object.

An image sensing device such as a CCD is disposed on an image forming plane Simg of this imaging lens. Depending upon the configuration of a camera to which the lens is attached, various types of optical members GC may be disposed between the fourth lens G4 and the image sensing device. For example, an optical member formed into a plane plate such as a cover glass for protecting an image sensing plane or an infrared light cut-off filter is disposed. Note that in the respective configuration examples shown in FIGS. 1 to 5, an image side surface of the optical member GC is made to coincide with the image sensing plane.

The first lens G1 has a positive refractive power in the vicinity of the optical axis. The first lens G1 has an object side surface including a convex shape in the vicinity of the optical axis. The first lens G1 is preferably formed into a positive meniscus shape with an object side surface including a convex surface in the vicinity of the optical axis.

The second lens G2 has a positive refractive power in the vicinity of the optical axis. In the configuration examples in FIGS. 1, 3 and 5, an image side surface thereof includes a convex shape in the vicinity of the optical axis. More specifically, the second lens G2 includes a double-convex shape in the vicinity of the optical axis. In the configuration examples in FIGS. 2 and 4, the second lens G2 is formed into a positive meniscus shape in which the object side surface thereof includes a convex surface in the vicinity of the optical axis.

The third lens G3 has an object side surface including a concave surface in the vicinity of the optical axis and has a negative refractive power. The third lens G3 preferably includes a double-concave shape in the vicinity of the optical axis. In addition, the third lens G3 is preferably formed into a meniscus shape on a peripheral portion thereof.

The fourth lens G4 has a positive meniscus shape with an object side surface thereof including a convex surface in the vicinity of the optical axis. The fourth lens G4 is the lens which lies closest to the image sensing plane in the four lenses. Because of this, in the fourth lens, compared to the first lens G1 to the third lens 63, a bundle of rays of light is separated for each angle of view. Consequently, by utilizing an aspheric surface properly in the fourth lens G4, correcting aberrations for each angle of view is implemented easily, and field curvature and distortion can be corrected easily. In addition, the telecentric characteristic is easily secured. Because of this, as with the configuration examples in FIGS. 3 to 5, for example, the object side surface of the fourth lens G4 is preferably formed into a convex shape in the vicinity of the optical axis and into a concave shape on the peripheral portion thereof. In addition, an image side surface thereof is preferably formed into, for example, a concave shape in the vicinity of the optical axis and into a convex shape on the peripheral portion thereof.

The imaging lens preferably satisfies the following conditional expressions. In those conditional expressions, f denotes focal length of the single focus imaging lens, ft a focal length of the first lens G1, f2 a focal length of the second lens G2, f3 a focal length of the third lens G3, and f4 a focal length of the fourth lens. In addition, since the second lens G2 functions as the focusing lens, a conditional expression (2) is substantially the same as the conditional expression (X).

$$1.0 < f1/f < 3.0 \quad (1)$$

$$1.0 < f2/f < 5.0 \quad (2)$$

$$0.5 < |f3/f| < 1.0 \quad (3)$$

$$0.5 < f4/f < 1.0 \quad (4)$$

In addition, the fourth lens G4 preferably satisfies the following conditional expression. In the conditional expression, R4A denotes a paraxial radius of curvature of the object side surface of the fourth lens G4.

$$0.15 < R4A/f < 0.35 \quad (5),$$

Next, the function and advantage of the imaging lens will be described which is configured as has been described above will be described.

In this imaging lens, the configuration and refractive power of each of the lenses are made appropriate by the lens configuration which is made up of the relatively small number of lenses such as four lenses in total, thereby making it possible to realize miniaturization and high performance. In addition, the second lens G2, which functions as the focusing lens, is disposed between the first lens G1 and the third lens G3, and by shifting the second lens G2 on the optical axis Z1, the internal focusing type focus adjustment is implemented. In this case, since the focal length of the second lens G2 is set properly in such a manner as to satisfy the conditional expression (X) (the conditional expression (2)), the sensitivity of the second lens G2 (a sensitivity to a change in the position of image plane associated with a shift of the focusing lens) and the lens shift amount at the time of adjusting focus are suppressed to appropriate values, whereby a good focus adjustment is implemented without changing the overall length of the lens.

The conditional expressions (1) to (4) relates to focal lengths of the respective lenses, and in the event that the focal lengths deviate from numeric ranges defined by the respective conditional expressions, it becomes difficult to make miniaturization and high performance compatible with each other. By satisfying the conditions defined by the respective conditional expressions, an optimum power balance is realized between the respective lenses, the miniaturization and high performance become easy to be realized. In particular, the conditional expression (2) relates to the focal length of the second lens G2, which functions as the focusing lens, and in the event that the focal length thereof does not reach the numeric range defined by the second conditional expression, the power thereof becomes too large, whereby the sensitivity becomes too high, which is not preferable. On the contrary, in the event that the focal length exceeds the numeric range, the power becomes too small, whereby the shift amount of the second lens G2 becomes too larger and the lens system cannot be made compact, which is not preferable.

The conditional expression (5) relates to the radius of curvature of the object side surface of the fourth lens G4. By satisfying the conditional expression (5) with the third lens G3 made to have the double-concave shape in the vicinity of the optical axis to thereby optimize the configuration of the fourth lens G4, it becomes advantageous in correcting aberrations, and a back focus which is necessary to dispose a cover glass becomes easy to be secured. In the event that the relevant radius of curvature deviates from the numeric range defined by the conditional expression (5), it becomes difficult to realize those advantages.

In addition, in this imaging lens, by disposing the aperture stop St in front of or at the rear of the first lens, the lens system is obtained which is advantageous in reducing the overall length and securing the telecentric characteristic. Additionally, in this imaging lens, by optimizing the aspheric surface on each surface, aberrations can be corrected more effectively. In order to cope with the provision of an image sensing device equipped with a higher number of pixels, the telecentric characteristic is required. Namely, it is required that the incident angle of a chief ray of light on the image sensing device becomes substantially parallel to the optical axis (that is, the incident angle on the image sensing plane approaches zero relative to the normal of the image sensing plane). In this imaging lens, for example, by making an image side surface of the fourth lens G4, which is a final surface of the lens system which lies closest to the image sensing device, have a concave shape on the image side in the vicinity of the optical axis and have a convex shape on the image side on a peripheral portion thereof, aberrations are corrected properly at each angle of view, so that the incident angle of the bundle of rays of light on the image sensing device is controlled so as to be equal to or lower than a predetermined angle, whereby irregularities in quantity of light over a whole area of the image forming plane can be reduced. In addition, the configuration given to the image side surface of the fourth lens G4 is also advantageous in correcting field curvature and distortion.

As has been described heretofore, according to the imaging lens of the invention, since the internal focusing type focus adjustment is made to be implemented by disposing the focusing lens (the second lens G2) between the front lens group (the first lens G1) and the rear lens group (the third lens G3 and the fourth lens G4) in the single focus lens configuration which is made up of the relatively small number of lenses such as four lenses in total and the focal length of the focusing lens is optimized, the small, high-performance lens system can be realized which can implement a good focus adjustment without changing the overall length thereof.

EXAMPLES

Next, specific numeric examples of the imaging lens according to the embodiment will be described. Hereinafter, first to fifth numeric examples will be described altogether.

Specific lens data which correspond to the configuration of the imaging lens shown in FIG. 1 are shown in FIGS. 6A and 6B as Example 1. In particular, FIG. 6A shows lens data of Example 1, and FIG. 6B shows data in relation to aspheric surfaces. Shown in a surface number Si column in the lens data shown in FIG. 6A is a surface number of an ith (i=1 to 10) surface which results when giving reference alphanumerics to surfaces of the constituent lenses in the increasing order from an object side towards an image side with an object side surface of a first lens from the object side regarded as a first surface. Shown in a column of radius of curvature Ri is a value (mm) of a radius of curvature of the ith surface from the object side in such a manner as to correspond to the reference alphanumeric Ri given in FIG. 1. Similarly, shown in an on-axis surface spacing Di column is a specing(mm) on the optical axis between the ith surface Si and the i+1th surface Si+1 from the object side. Shown in an Ndj column is a value of the refractive index of a jth optical element (j=1 to 5) from the object side relative to a d-line (wavelength being 587.6 nm). Shown in a udj column is a value of the Abbe number of the jth optical element from the object side relative to the d-line. FIG. 6A also shows additional various data including values of paraxial focal length f (mm) of the single focus imaging lens, F number (F No.) and angle of view 2ω (ω=semi-angle of view).

In the zoom lens according to Example 1, a second lens G2 functions as a focusing lens and shifts on the optical axis for adjusting focus. Because of this, in the lens data shown in FIG. 6A, on-axis surface spacings D2 and D4 which lie ahead of and behind the second lens G2, respectively, are variable. In FIG. 6A, a value of on-axis surface spacing resulting when adjusting the focus of the lens on an object at infinity and a value of on-axis surface spacing resulting when adjusting the focus on an object at near distance (20 cm) are shown for each of D2 and D4.

In the imaging lens according to Example 1, both surfaces of each lens are formed into an aspherical shape. In the lens data in FIG. 6A, numeric values of radii of curvatures in the vicinity of the optical axis are shown as radii of curvatures of these aspherical surfaces. In numeric values shown as aspherical surface data in FIG. 6B, a character "E" indicates that a numeric value following the character is a power exponent of 10 as a base and that a numeric value represented by an exponential function of 10 as a base is multiplied by a numerical value before the "E." For example, "1.0E-02" indicates "$1.0 \times 10^{-2}$."

As aspherical surface data, values of respective coefficients $A_n$, K in an expression of the shape of an aspherical surface expressed by the following expression (A) are shown. More specifically, Z denotes the length (mm) of a perpendicular which is drawn from a point on the aspherical surface which lies in a position of a height h from the optical axis Z1 down to a tangent plane (a plane perpendicular to the optical axis Z1) to an apex of the aspherical surface. In the imaging lens according to Example 1, the respective aspherical surfaces of the lenses excluding the second lens G2 are represented by utilizing third-order to tenth-order coefficients $A_3$ to $A_{10}$ effectively as the aspherical surface coefficient $A_n$. In the second lens G2, coefficients $A_3$, $A_5$, $A_7$, $A_9$ of orders represented by odd numbers are 0.

$$Z = C \cdot h^2 / \{1 + (1 - K \cdot C^2 \cdot h^2)^{1/2}\} \Sigma A_n \cdot h^n \quad (A)$$

(n=integer of 3 or larger)

where,

Z: depth (mm) of aspherical surface;

h: distance (height) (mm) from the optical axis to lens surface;

K: conical constant (second-order aspheric surface coefficient)

C: paraxial curvature=1/R (R: paraxial radius of curvature)

$A_n$: nth-order aspherical coefficient

In a similar manner to the imaging lens according to example 1, specific lens data corresponding to the configuration of the imaging lens shown in FIG. 2 are shown in FIGS. 7A and 7B as Example 2. In addition, in the similar manner, specific lens data corresponding to the configuration of the imaging lens shown in FIG. 3 are shown in FIGS. 8A and 8B as Example 3. Additionally, in the similar manner, specific lens data corresponding to the configuration of the imaging lens shown in FIG. 4 are shown in FIGS. 9A and 9B as Example 4. In addition, in the similar manner, specific lens data corresponding to the configuration of the imaging lens shown in FIG. 5 are shown in FIGS. 10A and 10B as Example 5. Note that in any of Examples 2 to 5, as with Example 1, both surfaces of each lens are made aspherical.

FIG. 11 shows values related to the respective conditional expressions altogether for the respective examples. As is seen from FIG. 11, the values of the respective examples fall within the numeric ranges of the respective conditional expressions.

Figure 12A:
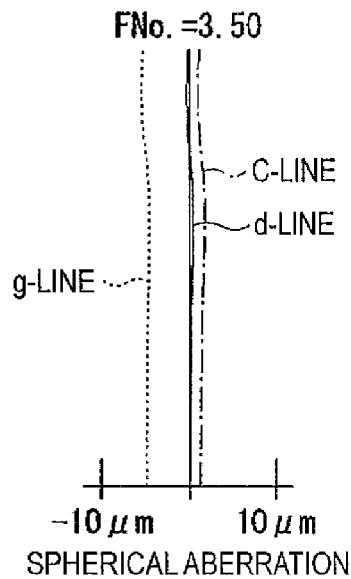
FIG. 12A shows an aberration diagram of the imaging lens according to Example 1 of the invention with an object distance set at infinity and shows spherical aberration.
Figure 12B:
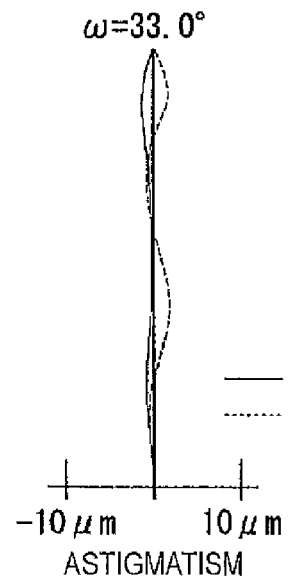
FIG. 12B shows an aberration diagram of the imaging lens according to Example 1 of the invention with an object distance set at infinity and shows astigmatism.
Figure 12C:
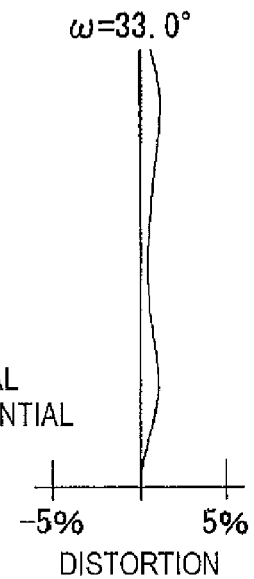
FIG. 12C shows an aberration diagram of the imaging lens according to Example 1 of the invention with an object distance set at infinity and shows distortion.
Figure 13A:
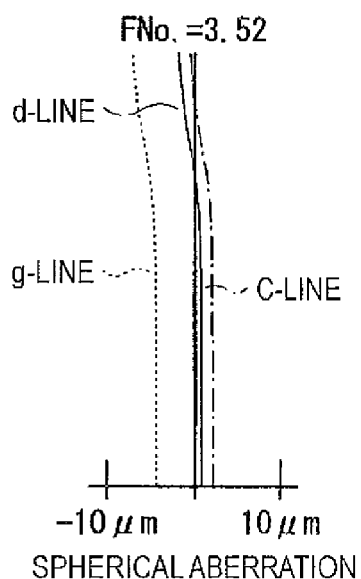
FIG. 13A shows an aberration diagram of the imaging lens according to Example 1 of the invention with the object distance set to a near distance and shows spherical aberration.
Figure 13B:
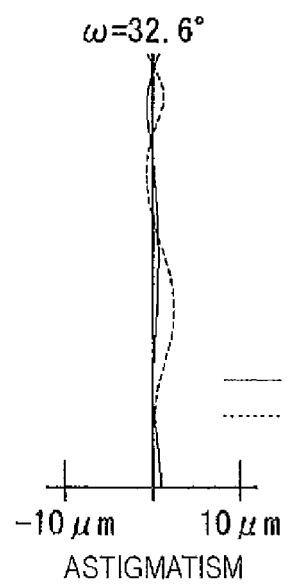
FIG. 13B shows an aberration diagram of the imaging lens according to Example 1 of the invention with the object distance set to a near distance and shows astigmatism.
Figure 13C:
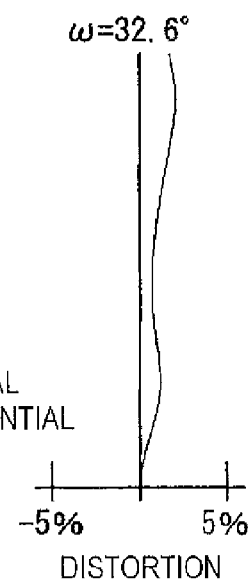
FIG. 13C shows an aberration diagram of the imaging lens according to Example 1 of the invention with the object distance set to a near distance and shows distortion.

FIGS. 12A to 12C show, respectively, spherical aberration, astigmatism, and distortion in the imaging lens according to Example 1 with the focus thereof adjusted on an object at infinity. An aberration based with the d-line used as a basic wavelength is shown in each aberration diagram. In the spherical aberration diagram, aberrations relative to a g-line (whose wavelength is 435.8 nm) and a C-line (whose wavelength is 656.3 nm) are also shown. In the astigmatism diagram, a solid line shows an aberration in a sagital direction, and a broken line shows an aberration in a tangential direction. F No. denotes an F value, and ω denotes a semi-angle of view. Similarly, aberrations with the focus adjusted on an object at a near distance (20 cm) are shown in FIGS. 13A to 13C.

Figure 14A:
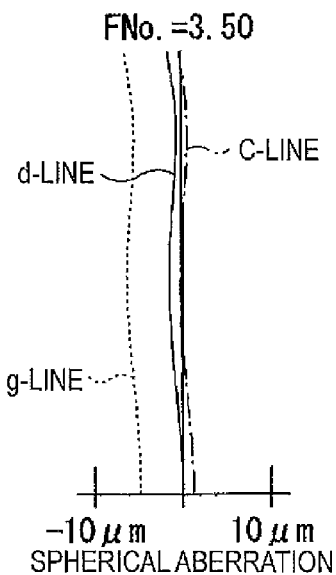
FIG. 14A shows an aberration diagram of the imaging lens according to Example 2 of the invention with an object distance set at infinity and shows spherical aberration.
Figure 14B:
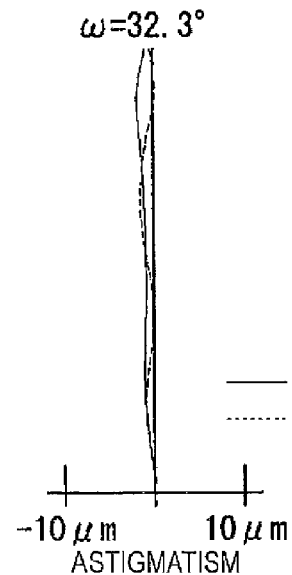
FIG. 14B shows an aberration diagram of the imaging lens according to Example 2 of the invention with an object distance set at infinity and shows astigmatism.
Figure 14C:
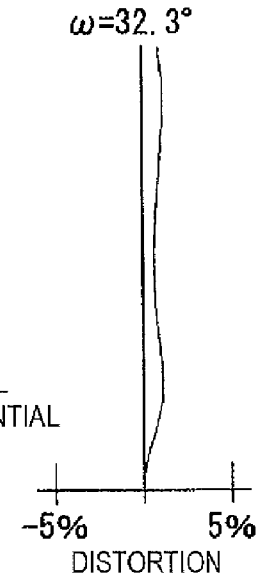
FIG. 14C shows an aberration diagram of the imaging lens according to Example 2 of the invention with an object distance set at infinity and shows distortion.
Figure 15A:
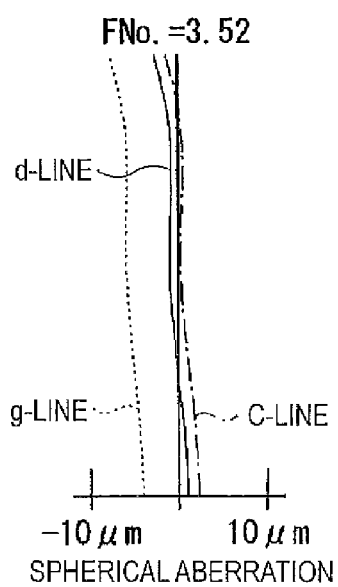
FIG. 15A shows an aberration diagram of the imaging lens according to Example 2 of the invention with the object distance set to a near distance and shows spherical aberration.
Figure 15B:
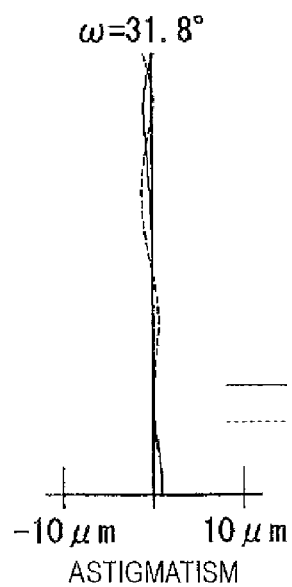
FIG. 15B shows an aberration diagram of the imaging lens according to Example 2 of the invention with the object distance set to a near distance and shows astigmatism.
Figure 15C:
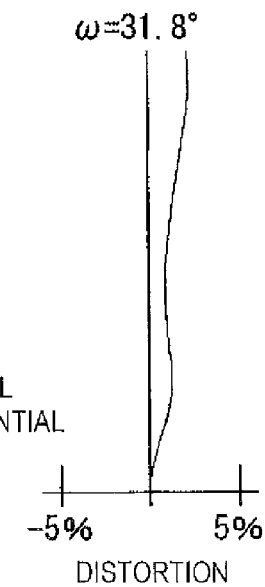
FIG. 15C shows an aberration diagram of the imaging lens according to Example 2 of the invention with the object distance set to a near distance and shows distortion.
Figure 16A:
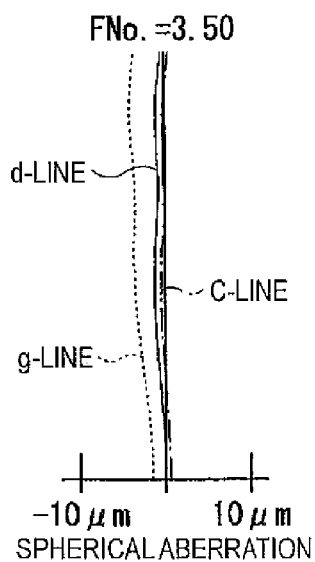
FIG. 16A shows an aberration diagram of the imaging lens according to Example 3 of the invention with an object distance set at infinity and shows spherical aberration.
Figure 16B:
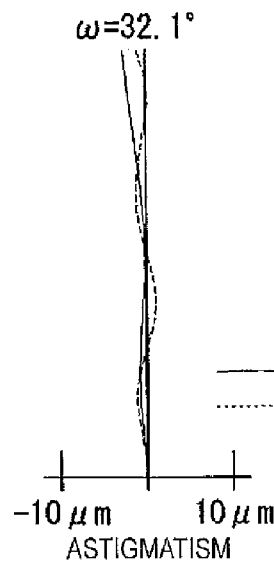
FIG. 16B shows an aberration diagram of the imaging lens according to Example 3 of the invention with an object distance set at infinity and shows astigmatism.
Figure 16C:
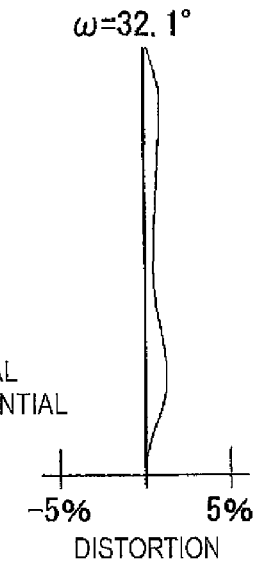
FIG. 16C shows an aberration diagram of the imaging lens according to Example 3 of the invention with an object distance set at infinity and shows distortion.
Figure 17A:
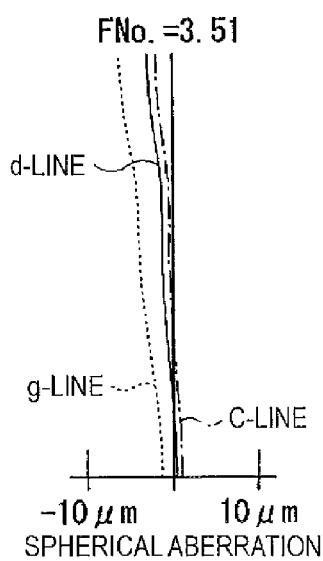
FIG. 17A shows an aberration diagram of the imaging lens according to Example 3 of the invention with the object distance set to a near distance and shows spherical aberration.
Figure 17B:
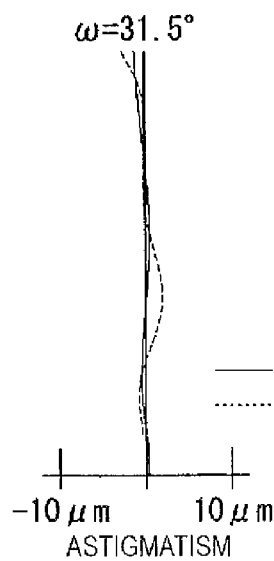
FIG. 17B shows an aberration diagram of the imaging lens according to Example 3 of the invention with the object distance set to a near distance and shows astigmatism.
Figure 17C:
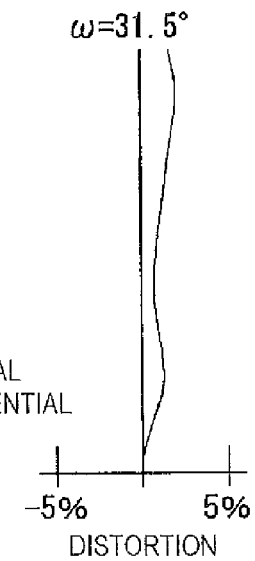
FIG. 17C shows an aberration diagram of the imaging lens according to Example 3 of the invention with the object distance set to a near distance and shows distortion.
Figure 18A:
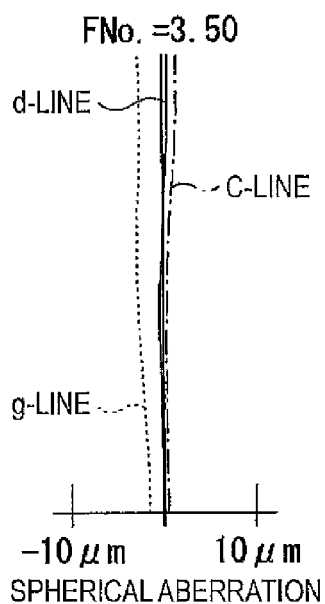
FIG. 18A shows an aberration diagram of the imaging lens according to Example 4 of the invention with an object distance set at infinity and shows spherical aberration.
Figure 18B:
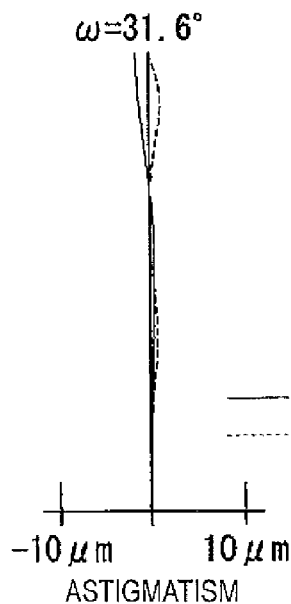
FIG. 18B shows an aberration diagram of the imaging lens according to Example 4 of the invention with an object distance set at infinity and shows astigmatism.
Figure 18C:
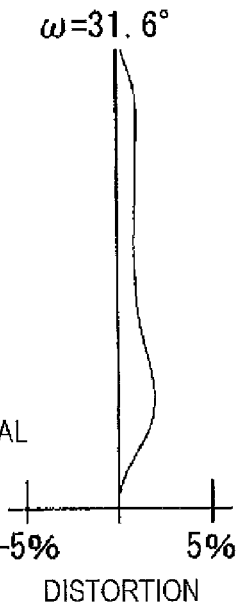
FIG. 18C shows an aberration diagram of the imaging lens according to Example 4 of the invention with an object distance set at infinity and shows distortion.
Figure 19A:
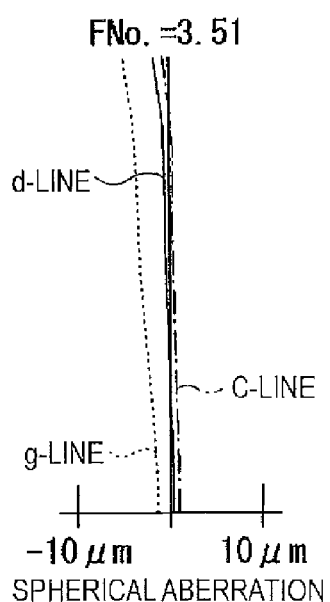
FIG. 19A shows an aberration diagram of the imaging lens according to Example 4 of the invention with the object distance set to a near distance and shows spherical aberration.
Figure 19B:
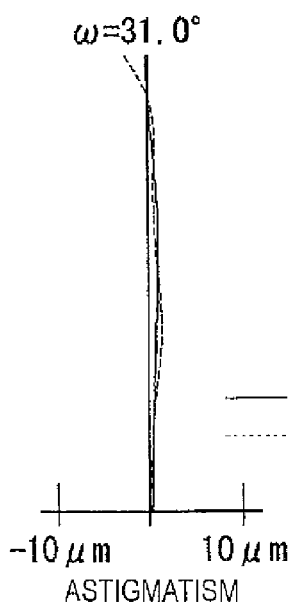
FIG. 19B shows an aberration diagram of the imaging lens according to Example 4 of the invention with the object distance set to a near distance and shows astigmatism.
Figure 19C:
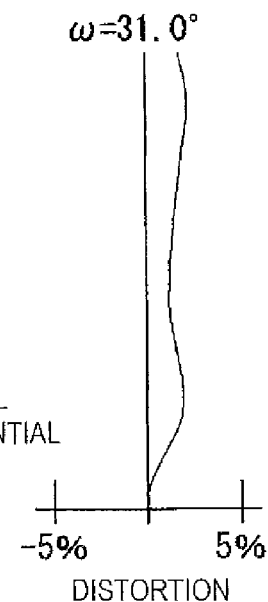
FIG. 19C shows an aberration diagram of the imaging lens according to Example 4 of the invention with the object distance set to a near distance and shows distortion.
Figure 20A:
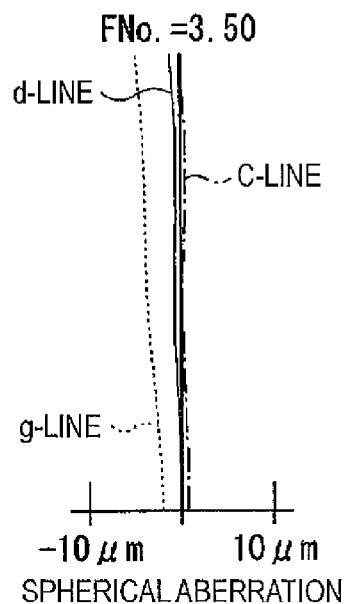
FIG. 20A shows an aberration diagram of the imaging lens according to Example 5 of the invention with an object distance set at infinity and shows spherical aberration.
Figure 20B:
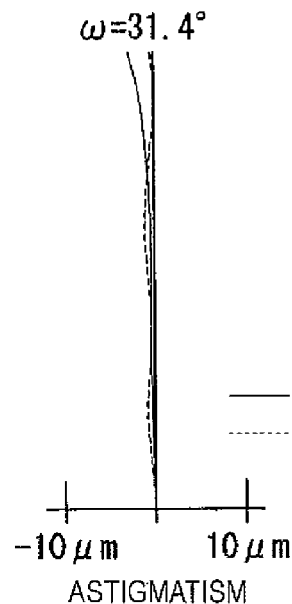
FIG. 20B shows an aberration diagram of the imaging lens according to Example 5 of the invention with an object distance set at infinity and shows astigmatism.
Figure 20C:
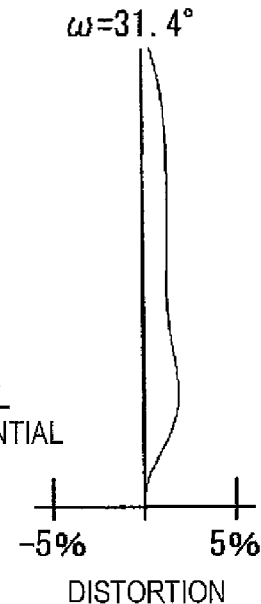
FIG. 20C shows an aberration diagram of the imaging lens according to Example 5 of the invention with an object distance set at infinity and shows distortion.
Figure 21A:
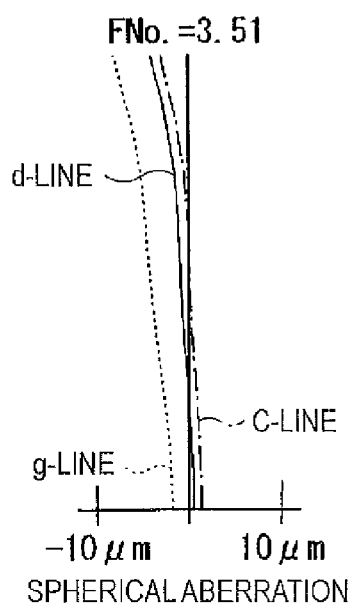
FIG. 21A shows an aberration diagram of the imaging lens according to Example 5 of the invention with the object distance set to a near distance and shows spherical aberration.
Figure 21B:
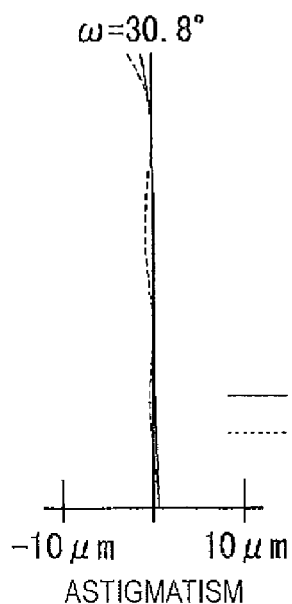
FIG. 21B shows an aberration diagram of the imaging lens according to Example 5 of the invention with the object distance set to a near distance and shows astigmatism.
Figure 21C:
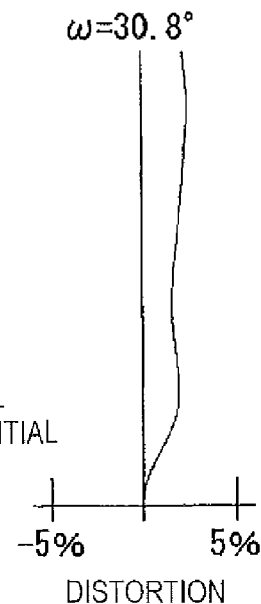
FIG. 21C shows an aberration diagram of the imaging lens according to Example 5 of the invention with the object distance set to a near distance and shows distortion.

In a similar manner to Example 1, in the imaging lens according to Example 2, aberrations with the focus adjusted on an object at infinity are shown in FIGS. 14A to 14C, and aberrations with the focus adjusted on an object at a near distance (20 cm) are shown in FIGS. 15A to 15C. In addition, in the similar manner, in the imaging lens according to Example 3, aberrations with the focus adjusted on an object at infinity are shown in FIGS. 16A to 16C, and aberrations with the focus adjusted on an object at a near distance (20 cm) are shown in FIGS. 17A to 17C. Additionally, in the similar manner, in the imaging lens according to Example 4, aberrations with the focus adjusted on an object at infinity are shown in FIGS. 18A to 18C, and aberrations with the focus adjusted on an object at a near distance (20 cm) are shown in FIGS. 19A to 19C. In addition, in the similar manner, in the imaging lens according to Example 5, aberrations with the focus adjusted on an object at infinity are shown in FIGS. 20A to 20C, and aberrations with the focus adjusted on an object at a near distance (20 cm) are shown in FIGS. 21A to 21C.

As is seen from the respective numeric values data and the respective aberration diagrams, in the respective examples, with the single focus lens configuration made up of the four lenses in total, a good focus adjustment is enabled without changing the overall length of the lens by making the second lens G2 function as the focusing lens, and the small, high-performance lens system can be realized.

Note that the invention is not limited to the embodiment and the respective examples that have been described heretofore but can be modified variously. For example, the values of radius of curvature, on-axis surface spacing and refractive index are not limited to the values shown in the respective numeric examples and can take other values.

According to the imaging lens of the invention, since the internal focusing type focus adjustment is made to be implemented by disposing the focusing lens between the front lens group and the rear lens group, which are both made up of the relatively small number of lenses and the focal length of the focusing lens is optimized, the small, high-performance imaging lens system can be realized which is made to implement a good focus adjustment without changing the overall length thereof, even though the lens system is a single focus lens made up of a relatively small number of lenses.

The entire disclosure of each and every foreign patent application from which the benefit of foreign priority has been claimed in the present application is incorporated herein by reference, as if fully set forth.

What is claimed is:

1. A single focus imaging lens comprising:
   a front lens group including one or two lenses and having a positive refractive power as a whole;
   a rear lens group including two or three lenses and having a negative refractive power as a whole; and
   a focusing lens disposed between the front lens group and the rear lens group, the focusing lens consists of a single integral lens that has a positive refractive power and is made to move on an optical axis for adjusting focus,
   wherein the following conditional expression is satisfied:

$$1.0 < FL/f < 5.0 \quad (X)$$

where
   f: focal length of the single focus imaging lens;
   FL: focal length of the focusing lens that consists of a single integral lens.

2. A single focus imaging lens comprising, in order from an object side thereof:
   a first lens having a positive refractive power;
   a second lens having a positive refractive power;
   a third lens having a negative refractive power with an object side surface including a concave surface in the vicinity of the optical axis; and
   a fourth lens having a positive meniscus shape with an object side surface including a convex surface in the vicinity of the optical axis,
   wherein the first lens is made to function as a front lens group including one lens and having a positive refractive power as a whole,
   the third lens and the fourth lens are made to function as a rear lens group including two lenses and having a negative refractive power as a whole,
   the second lens is made to function as a focusing lens disposed between the front lens group and the rear lens group, that has a positive refractive power, and the second lens is made to move on an optical axis for adjusting focus, and wherein the following conditional expression is satisfied:

$$1.0 < FL/f < 5.0 \quad (X)$$

where
   f: focal length of the single focus imaging lens;
   FL: focal length of the second lens.

3. The imaging lens as set forth in claim 2, wherein the following conditional expressions are satisfied:

$$1.0 < f1/f < 3.0 \quad (1)$$

$$1.0 < f2/f < 5.0 \quad (2)$$

$$0.5 < |f3/f| < 1.0 \quad (3)$$

$$0.5 < f4/f < 1.0 \quad (4)$$

Where
   f: focal length of the single focus imaging lens;
   f1: focal length of the first lens;
   f2: focal length of the second lens;
   f3: focal length of the third lens;
   f4: focal length of the fourth lens.

4. The imaging lens as set forth in claim 2,
   wherein the first lens has an object side surface including a convex shape in the vicinity of the optical axis,
   the second lens has an image side surface including a convex shape in the vicinity of the optical axis,
   the third lens has a concave shape in the vicinity of the optical axis on both sides thereof, and
   the fourth lens satisfies the following conditional expression:

$$0.15 < R4A/f < 0.35 \quad (5),$$

where
   f: focal length of the single focus imaging lens;
   R4A: paraxial radius of curvature of the object side surface of the fourth lens.

5. The imaging lens as set forth in claim 3,
   wherein the first lens has an object side surface including a convex shape in the vicinity of the optical axis,
   the second lens has an image side surface including a convex shape in the vicinity of the optical axis,
   the third lens has a concave shape in the vicinity of the optical axis on both sides thereof, and
   the fourth lens satisfies the following conditional expression:

$$0.15 < R4A/f < 0.35 \quad (5),$$

where
   f: focal length of the single focus imaging lens;
   R4A: paraxial radius of curvature of the object side surface of the fourth lens.

* * * * *